United States Patent [19]

Domes et al.

[11] 4,216,972
[45] Aug. 12, 1980

[54] UNITIZED FACE TYPE SEAL

[75] Inventors: E. A. Domes, Carpentersville; Forrest C. Taylor, Northlake; Lawrence A. Venere, Wood Dale, all of Ill.

[73] Assignee: International Harvester Company, Chicago, Ill.

[21] Appl. No.: 45,495

[22] Filed: Jun. 4, 1979

Related U.S. Application Data

[62] Division of Ser. No. 931,587, Aug. 7, 1978.

[51] Int. Cl.³ .............................................. F16J 15/34
[52] U.S. Cl. ........................................ 277/39; 277/42; 277/92
[58] Field of Search ................... 277/38, 42, 39, 92, 277/83

[56] References Cited

U.S. PATENT DOCUMENTS

| | | | |
|---|---|---|---|
| 2,509,461 | 3/1950 | Ulseth | 277/39 |
| 2,911,840 | 11/1959 | Muller et al. | 277/42 |
| 3,073,657 | 1/1963 | Oxford | 277/38 |
| 3,179,424 | 4/1965 | Carson et al. | 277/39 |
| 3,241,843 | 3/1966 | Hatch et al. | 277/92 |
| 3,241,844 | 3/1966 | Morley | 277/42 |
| 3,372,940 | 3/1968 | Keller | 277/92 |
| 3,452,995 | 7/1969 | Engelking | 277/42 |
| 3,524,654 | 8/1970 | Hasselbacher et al. | 277/92 |
| 3,542,377 | 11/1970 | Voitik | 277/42 |
| 3,560,059 | 2/1971 | Miyake | 277/92 |
| 3,682,488 | 8/1972 | Matsushma | 277/39 |
| 3,985,366 | 10/1976 | Plouzek | 277/92 |

Primary Examiner—Robert I. Smith
Attorney, Agent, or Firm—Douglas W. Rudy; Ronald C. Kamp; F. David AuBuchon

[57] ABSTRACT

A primary face type seal is maintained in face to face engagement by secondary elastomer seals. A multi-part retainer encircles the primary and secondary seals to provide a unitizing housing for permanently locating the enclosed seals in appropriate alignment.

4 Claims, 4 Drawing Figures

UNITIZED FACE TYPE SEAL

This is a division of application Ser. No. 931,587, filed Aug. 7, 1978.

BACKGROUND OF THE INVENTION

1. Field of the Invention

This invention is concerned with improvements in face type seals and more particularly with incorporation of the face type seals into a unitized housing.

2. Description of the Prior Art

Face type seals, also called rotary end face mechanical seals, generally have a primary seal comprised of a first and second relatively stiff primary sealing ring and a pair of secondary sealing or annular resistant rings generally of elastomeric material. The sealing rings have abutting mating faces or surfaces that are highly polished hard surfaced metallic faces which are lapped to extremely flat superfine finish profiles. The secondary sealing members are positioned between adjacent housings and the back sides of the primary sealing rings. One housing is generally a stationary housing, for instance an axle housing, while the other housing is usually an internal bore in a rotating member, for instance a wheel hub.

The annular resilient rings serve a dual function. Firstly the resilient rings provide a loading force on the back side of the primary sealing rings to ensure good face to face contact and secondly the resilient rings provide a seal that prevents fluid flow from one side of the resilient rings to the other, either between one of the housing/resilient ring margins or one of the sealing ring/resilient ring margins.

U.S. Pat. No. 3,940,154 to Olsson and U.S. Pat. No. 3,241,843 to Hatch show typical face type seals that are different from this invention but set forth the state of the art.

Prior art seals have proven themselves effective in severe duty environments where the seal is constantly exposed to dirt, grit and dust. Hence these face type seals lend themselves particularly well to off highway construction equipment.

The need to maintain the superfine finish on the mating faces of the sealing rings is critical to good seal performance and life expectancy. It has been found that once the sealing rings and the accompanying resilient rings are properly installed the sealing rings will perform well, however, if contamination is present on the superfine finish surfaces of the sealing rings at the time of installation then the seal will fail prematurely.

At least one solution to preventing the inclusion of dirt during assembly is the use of a cellulose band, shown in the above mentioned Hatch patent, that is shrunk around the outer periphery of the sealing rings at the time of manufacture. Subsequent to the installation of the joined sealing rings the normal rotation of the adjoining housings will break the band which is then disintegrated.

The difficulty experienced with prior art face type sealing rings is that there are two basic component sets each set including a primary sealing ring and an annular resilient ring. These two basic component sets eventually are separated, either when the host structure is overhauled or even earlier when the machine is being assembled (if the prior art patented band is not used). This separation of the two basic component sets provides a chance for foreign matter to get between the mating faces and ruin the seal.

Another difficulty with prior art face type seal sets is that as they are independently installed in the host housings there is a chance of misalignment between them that will generate unequal loading around the faces of the mating sealing rings. This unequal loading may also be detrimental to the life expectancy of the seal.

It is among the objects of this invention to provide a face type seal that has a unifying multi-part enclosure for containing the two basic component sets.

Another object of the invention is to provide a face type seal that has all its parts contained in a single unitized component.

Also an object is to provide a unitized face type seal that, as a single component, is constructed so as to prevent the inclusion of contamination between the sealing faces prior to installation.

Another object is to provide a face type seal that is arranged as a unitized component so as to ensure perfect alignment between the seal faces before, during and after installation.

A further object of this invention is to provide a face type seal having an installation location guide flange integral with the unitized face seal component.

These and other objects and advantages of this invention will be apparent from the accompanying description and drawing figures.

SUMMARY OF THE INVENTION

A housing is provided to maintain the basic components of a face type seal in a permanent position relative to each other. In one embodiment the housing is made up of an interior shell, an exterior shell member and a circumferential spacer. The interior shell is a generally annular member having a base portion. A radially extending wall perpendicular to the base portion and a transverse axially disposed upper portion perpendicular to the radially extending wall. A depth limiting projection extends radially inwardly and perpendicularly from the base portion of the interior shell. An elastomer coating may be bonded to the inside diameter of the interior shell.

The exterior shell of the housing is a circumferential ring having a broad, flat circumferential band section that is arranged outboard from and concentrically to the base portion of the interior shell. The external shell has radially projecting flange members at right angles to the broad flat section thereof projecting inwardly toward the base of the interior shell.

A circumferential spacer, having an outside diameter equivalent to the inside diameter of the broad flat section of the exterior shell, is positioned in the exterior shell during assembly.

The interior and exterior shell members provide the housing for the well known face type seals which are concentrically arranged between the exterior shell and the interior shell. The annular resilient rings abut the outboard internal corner of the interior shell and the inwardly directed flange and the circumferential spacer of the exterior shell respectively to suspend the sealing members inside the unitized housing.

In a second embodiment of the unitized face type seal the depth limiting projection is replaced with a projection on the radially extending wall of the interior shell. Furthermore, the exterior shell is formed having the broad flat circumferential band split into two levels so that the circumferential spacer is eliminated. In the second embodiment an elastomeric seal is bonded to the outside diameter of the lesser diameter section of the exterior shell to fulfill sealing and insulating objectives.

BRIEF DESCRIPTION OF THE DRAWING FIGURES

Several embodiments of this invention are shown in the drawing figures wherein.

DETAILED DESCRIPTION OF THE INVENTION

Figure 1:
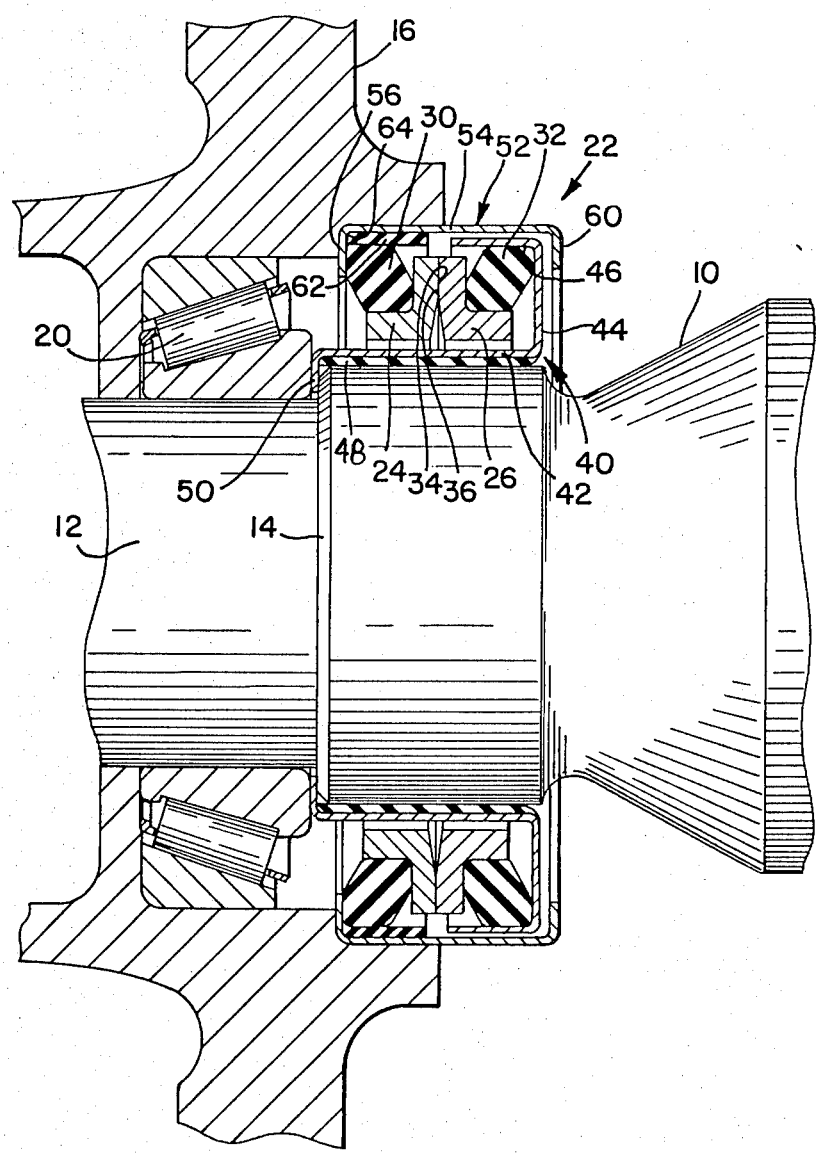
FIG. 1 is a cross sectional view of a unitized face type seal carried on a non-rotating spindle.
Figure 3:
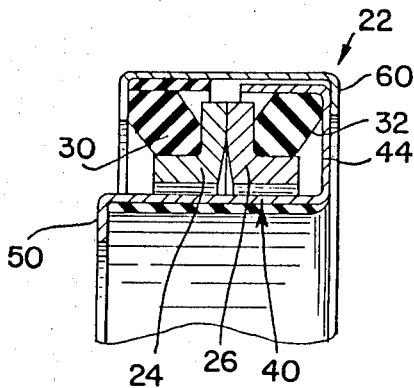
FIG. 3 is a cross sectioned view of a portion of the unitized face seal of FIG. 1.

A first embodiment of the invention is seen in FIGS. 1 and 3. Looking at these figures the environment consists of a non-rotating axle or spindle 10 having a reduced diameter portion 12 and a beveled step 14. The spindle supports a wheel 16 through at least one bearing means 20.

The unitized face seal, generally 22, is carried on the larger portion of the spindle 10. Well known in the prior art are seal component sets which include a first 24 and a second 26 sealing ring and a first 30 and a second 32 annular resilient ring. The sealing rings 24 and 26 are annular rings having divergently related generally radially and axially extending surfaces. The radial surfaces 34 and 36 are super fine finish surfaces that provide primary sealing. Lubricating fluid for lubricating the bearings 20 will occupy the space below the axial portions of the sealing rings.

The resilient annular rings 30 and 32 are compressed between the unifying housing members and the back side of the sealing rings 24 and 26 in order to press the sealing rings together into good contact and to seal the margins between the relatively non-rotating components.

The unifying structure is made up of an interior shell generally 40 having a plurality of surfaces including a flat base 42, a radially extending wall 44 perpendicular to the base 42, a transverse axially disposed upper portion 46 perpendicular to the upwardly extending wall 44 and extending back over the base 42 and a depth limiting tab 50. Bonded to the spindle side of the base 42 of the interior shell generally 40 is a laminate of elastomer material 52 which aids in maintaining the interior shell in non-rotating engagement with the spindle.

The depth limiting projection or tab 50 is shown in contact with the beveled step 14 of the spindle, thus movement of the interior shell to the right in FIG. 1 is positively prevented.

An exterior shell, generally 52 is a circumferential ring having a broad flat circumferential band 54 outboard from the interior shell 40. The exterior shell 52 has radially projecting flange members, first and second being 56 and 60 respectively, that project inwardly toward the interior shell 40.

Carried on the inner surface of the exterior shell 52 is a circumferential spacer 62 extending from a first interior corner 64 part way across the inside surface of the exterior shell. The purpose of this spacer is to equalize the distance between the base 42 surface and the inside diameter of the spacer 62 and the inside diameter of the transverse axially disposed upper portion 46 of the interior shell generally 40. This enables the use of equal diameter annular resilient rings 30 and 32.

In FIG. 1 the exterior shell generally 52 appears to be displaced laterally such that the second radially projecting flange member 60 is spaced away from the radially extending wall 44. The wheel 16 contacting the exterior shell has pushed the exterior shell laterally such that a degree of preload or compression is exerted on the first 30 and second 32 annular resilient rings so that the mating faces of the seals are urged together with designed force and leakage between the margins around each annular resilient sealing ring are tight enough to prevent fluid leakage around them.

In FIG. 3 the same embodiment of the unitized face seal, generally 22, is shown. In this cross section view of a portion of the structure the seal is in an uncompressed state as it would be before installation. Notice that the second radially projecting flange member 60 is in contact with the radially extending wall 44 of the interior shell generally 40. This figure shows that alignment of the faces of the sealing rings 24 and 26 is maintained even when the unitized seal is "on the shelf". Also since these faces are in contact with each other, the annular resilient rings 30 and 32 are under slight compression, there is little chance that foreign matter can get between the faces. The unitized face seal, as shown in FIG. 3, can be taken from stock and installed on a vehicle with good assurances that there will be no foreign matter between the mating faces and that the sealing rings will be properly aligned (providing of course that the unitized face seal is properly installed up to the depth limiting tab 50 and the wheel is put on squarely). On installation more compression will be transferred to the annular resilient rings thus forcing the seal rings together more forcefully.

Figure 2:
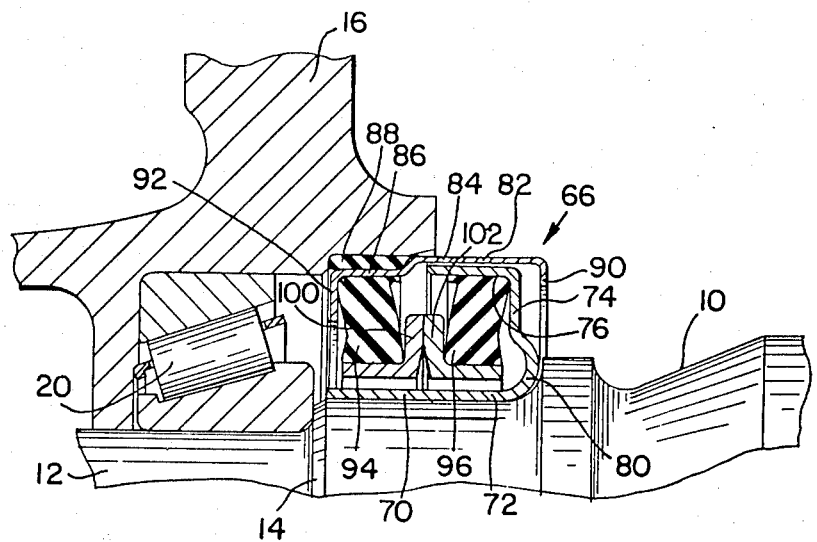
FIG. 2 is a cross sectional view of an alternative embodiment of the unitized face type seal carried on a non-rotating spindle.
Figure 4:
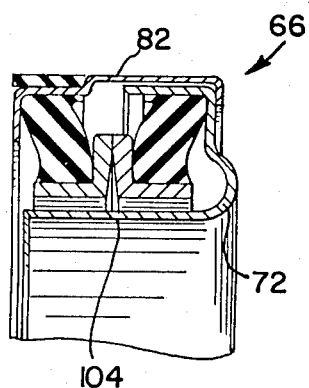
FIG. 4 is a cross sectioned view of a portion of the unitized face seal of FIG. 2.

FIGS. 2 and 4 portray a unitized face type seal similar to that already described in the first embodiment. The non-rotating axle or spindle 10 having the reduced diameter portion 12, and the beveled stop 14 between the axle diameters, the wheel 16 and the bearing 20 are all familiar from FIG. 1.

The second embodiment unitized face type seal, generally 66, has an inner shell 70 having a base portion 72, a radially extending wall 74 and an axially extending top portion 76 extending back over the base portion 72. The radially extending wall 74 has a projection 80 at the juncture of the base portion 72 and the radially extending wall 74. The projection 80 is used to limit the depth of the unitized face type seal and in this embodiment the projection takes the place of the depth limiting tab 50 of FIG. 1.

An outer shell 82 is a generallly circumferential band that has a first surface 84 and a second surface 86 providing two outer shell outside dimensions with the first surface 84 having a greater outside diameter. A first radially projecting tab 90 and a second radially projecting tab 92 extend from the circumferential surfaces 84 and 86 perpendicularly toward the inner shell 70.

A seal 88 of elastomeric material encircles the outer shell around the second surface of the outer shell. This elastomeric seal 88 provides a dual function of providing a seal between the wheel 16 and the unitized face seal outer shell and also acting as an insulator to insulate the unitized face seal from heat conducted through the wheel generated during braking of the wheel. This seal may also prevent rotation of the outer shell in the wheel.

A slightly revised cross sectional shape of the first and second annular resilient rings 94 and 96, is shown in this embodiment. Similarly, the cross sectional shape of the first and second seal rings 100 and 102 are slightly different in this embodiment. The cross sectional shape of these components is a matter of design choice.

Notice that in FIG. 4 the second embodiment of the face type seal generally 66 is shown in an uninstalled or relaxed position mode. The difference is that in FIG. 4 only minimal force is exerted on the mating faces when it is in this relaxed condition. The faces are in contact thus assuring that under normal conditions no dirt will get between the faces. As expected the outer shell 82 will be displaced laterally when the unitized seal is installed thus insuring increased force between the seal ring faces.

A thin film 104 of plastic is applied to the exterior side of the base 72 of the inner shell 70 that, coupled with a slight press fit, will fill minute machining marks on the accompanying members, i.e. spindle 10, which are often avenues of oil leakage.

The foregoing description has described two embodiments of unitized face type seals each fulfilling various objects of the invention and setting forth advantages over the prior art. Although specific details have been recited it is expected that various nuances of design may be selected to optimize the effectiveness of the invention. For instance various shapes of annular resilient rings and seal rings could be utilized without departing from the spirit and scope of the appended claims.

What is claimed is:

1. A unitized face type seal comprising:
a first and a second annular face type seal ring having axially and radially extending surfaces and flat engagement surfaces machined on said radially extending surfaces;
a first and a second annular resilient ring in contact with the non engaging surfaces of said respective first and said second annular face type seal ring;
an interior shell having a base portion, a radially extending wall, a projection in said radially extending wall at the juncture of said base portion in said radially extending wall and a transverse axially disposed upper portion for maintaining said second annular resilient ring in position;
an exterior shell having a circumferential band portion and a first and a second radially projecting flange member, said second radially projecting flange member extending toward said base of said interior shell parallel to said radially extending wall of said interior shell;
a seal of elastomeric material having a width less than the width of said circumferential band portion of said exterior shell whereby said interior shell, said exterior shell and said seal of elastomeric material provide a unitized housing for supporting said first and second face type seal rings through said first and second annular resilient rings in face to face contact and properly aligned relative to each other at all times.

2. The invention in accordance with claim 1 wherein said exterior shell has a first surface and a second surface of different diametric dimensions said first surface having a greater outside diameter than the outside diameter of said second surface.

3. The invention in accordance with claim 2 wherein the inner diameter of said first surface is grater than the inner diameter of said second surface.

4. The invention in accordance with claim 3 wherein said inner diameter of said second surface is equal to the inner diameter of said transverse axially disposed upper portion of said interior shell.

* * * * *